(12) United States Patent
Ruby, III et al.

(10) Patent No.: US 9,840,863 B2
(45) Date of Patent: Dec. 12, 2017

(54) VEHICLE DOOR STRUT APPARATUS, AND METHODS OF USE AND MANUFACTURE THEREOF

(71) Applicant: Honda Motor Co., Ltd., Tokyo (JP)

(72) Inventors: Joseph Patrick Ruby, III, Marysville, OH (US); Travis James Lonas, Dublin, OH (US); Makoto Watanabe, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 15/065,848

(22) Filed: Mar. 9, 2016

(65) Prior Publication Data

US 2017/0260791 A1    Sep. 14, 2017

(51) Int. Cl.
| | |
|---|---|
| E05F 3/18 | (2006.01) |
| E05F 5/08 | (2006.01) |
| E05F 15/611 | (2015.01) |
| F16F 13/00 | (2006.01) |
| F16H 25/20 | (2006.01) |
| B60J 5/10 | (2006.01) |

(52) U.S. Cl.
CPC ...... *E05F 3/18* (2013.01); *B60J 5/10* (2013.01); *E05F 5/08* (2013.01); *E05F 15/611* (2015.01); *F16F 13/007* (2013.01); *F16H 25/20* (2013.01); *E05Y 2900/546* (2013.01)

(58) Field of Classification Search
CPC ...... B60J 5/10; B60J 5/106; E05F 3/18; E05F 15/611; E05F 5/08; F16H 25/20; F16F 13/007; E05Y 2900/546

USPC ...... 296/56, 106, 146.8; 267/195, 219, 221, 267/259; 74/89; 49/324, 334
See application file for complete search history.

(56) References Cited

U.S. PATENT DOCUMENTS

| | | | |
|---|---|---|---|
| 5,599,129 A | 2/1997 | Clifton et al. | |
| 6,007,267 A | 12/1999 | Vanhorn | |
| 6,086,059 A | 7/2000 | Runesson et al. | |
| 6,877,791 B2 | 4/2005 | Greuel et al. | |
| 7,051,986 B1 | 5/2006 | Taubmann et al. | |
| 7,080,572 B2 | 7/2006 | Blendea | |
| 7,866,728 B2 * | 1/2011 | Suzuki | E05F 15/603 296/146.4 |
| 2001/0035725 A1 * | 11/2001 | Mintgen | E05F 15/627 318/445 |
| 2012/0024092 A1 | 2/2012 | Schoenherr et al. | |

* cited by examiner

*Primary Examiner* — Stephen Gordon
(74) *Attorney, Agent, or Firm* — Kenealy Vaidya LLP (57) ABSTRACT

A vehicle spring assembly includes a cylindrical hollow cover defining an opening at each end. A spring is disposed within the cover, and fittings disposed at each end of the cover are configured to contain the spring within the cover. Each fitting defines an aperture. An elongated damper extends in part within the spring along a direction of elongation. The damper includes a pair of opposing end sections each extending through and projecting from the aperture of one of the fittings. Each end section defines a groove. One end section is connectable to a vehicle tailgate, and the other end section is connectable to a vehicle body. Fasteners securing the fittings to the cover are disposed adjacent the grooves defined in the damper end sections.

20 Claims, 6 Drawing Sheets

FIG. 5C

VEHICLE DOOR STRUT APPARATUS, AND METHODS OF USE AND MANUFACTURE THEREOF

BACKGROUND

The disclosed subject matter is directed to a vehicle door strut apparatus, and methods of use and manufacture thereof. More particularly, the disclosed subject matter is directed to methods and apparatus for enhancing failsafe capabilities in vehicle assembly, and facilitating controlled failure and breaking of vehicle door strut apparatuses within vehicles.

Door and panel struts can be provided for connecting doors and panels to a vehicle body to facilitate opening and closing of the doors and panels, such as struts connecting passengers doors, tailgates and trunks, hoods/bonnets, storage compartments, aerodynamic panels, etc. Some related art struts include springs that serve to counteract weight of the doors and/or panels to which the struts are connected to reduce an amount of effort needed to move and reposition the doors and panels. Reducing the amount of effort needed to move doors and panels may be beneficial for various reasons, such as to facilitate easier movement of the doors and panels which would otherwise subject vehicle operators to unnecessary physical strains or require enhanced door and panel motors having increased cost, size, complexity, etc.

SUMMARY

Some types of vehicles, such as passenger vehicles, include strut assemblies having springs positioned between ends of a damper, and thus it may be beneficial to provide a tube between the damper ends for containing the spring therein. For example, these containment tubes can include caps fastened to both ends of the tubes to enclose the spring within the tube.

In some such structures, the spring assembly may be configured such that excessive transverse and lateral forces on the assembly can cause structural failures at various portions of the assembly. Thus, portions of the assembly within which the spring is contained may be caused to break by the excessive forces. This structure may be subject to the disadvantage that containment of the spring within the assembly may be compromised should the assembly break at a portion containing the spring. In other words, the spring may be released from the assembly during structural failure, which poses both a safety risk and can lead to scattering of assembly parts, among other things.

It may therefore be beneficial to provide methods and apparatus that facilitate controlled failure of the struts at predetermined locations along the spring assembly. For example, it may be beneficial to provide a spring assembly having a spring surrounding a damper, the spring and a portion of the damper being contained within an outer tube, and the damper having grooves at portions outside the outer tube. The spring can be contained within the outer tube by end caps fastened to the damper on either side of the spring, the end caps positioned adjacent the respective grooves. The strut assembly can also include connection fittings positioned at opposing ends of the damper and spaced from the outer tube such that the grooves are located between the connection fittings and outer tube. This structure enables controlled failure of the spring assembly at predetermined locations outside the tube containing the spring and thereby impedes or prevents release of the spring from the assembly during instances of excessive forces applied to the assembly.

Some of the embodiments are therefore directed to a vehicle spring assembly for use with a spindle motor that causes the vehicle spring assembly to actuate a vehicle tailgate relative to a vehicle body. The vehicle spring assembly can include a cylindrical hollow cover that extends along a direction of elongation and that defines an opening at each opposing end. A spring disposed within the cover can extend along the direction of elongation. A pair of fittings can each be disposed at one of the ends of the cover and configured to contain the spring within the cover. Each of the fittings can define an aperture. An elongated damper can extend in part within the spring along the direction of elongation. The damper can include a pair of opposing end sections that each extend through and project from the aperture of one of the fittings. Each of the end sections can define a groove. One of the end sections can be connectable to the vehicle tailgate, and the other of the end sections can be connectable to the vehicle body. Each of a pair of fasteners can secure one of the fittings to the cover, and can be disposed adjacent one of the grooves defined in the end sections of the damper.

Some other embodiments are directed to spindle drive system for use with a vehicle tailgate and a vehicle body. The spindle drive system can include a vehicle spring assembly that includes a cylindrical hollow cover that extends along a direction of elongation and that defines an opening at each opposing end. A spring disposed within the cover can extend along the direction of elongation. A pair of fittings can each be disposed at one of the ends of the cover and configured to contain the spring within the cover. Each of the fittings can define an aperture. An elongated damper can extend in part within the spring along the direction of elongation. The damper can include a pair of opposing end sections that each extend through and project from the aperture of one of the fittings. Each of the end sections can define a groove. One of the end sections can be connectable to the vehicle tailgate, and the other of the end sections can be connectable to the vehicle body. Each of a pair of fasteners can secure one of the fittings to the cover, and can be disposed adjacent one of the grooves defined in the end sections of the damper. The spindle drive system can also include a spindle motor that is connected to the vehicle spring assembly and controllable to cause the vehicle spring assembly to actuate the vehicle tailgate relative to the vehicle body.

Still other embodiments are directed to a method of manufacturing a vehicle spring assembly for use with a spindle motor that causes the vehicle spring assembly to actuate a vehicle tailgate relative to a vehicle body. The method can include: forming an opening at each opposing end of a cylindrical hollow cover that extends along a direction of elongation; disposing a spring within the cover so as to extend along the direction of elongation; disposing each of a pair of fittings at one of the ends of the cover so as to contain the spring within the cover; defining an aperture in each of the fittings; disposing an elongated damper so as to extend in part within the spring along the direction of elongation, the damper including a pair of opposing end sections that each extend through and project from the aperture of one of the fittings; forming a groove in each of the end sections of the damper; connecting one of the end sections of the damper to the vehicle tailgate; connecting the other of the end sections of the damper to the vehicle body; securing the pair of fittings to the cover with a pair of fasteners; and disposing each of the fasteners adjacent one of the grooves defined in the end sections of the damper.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Overall Vehicle

Figure 1:
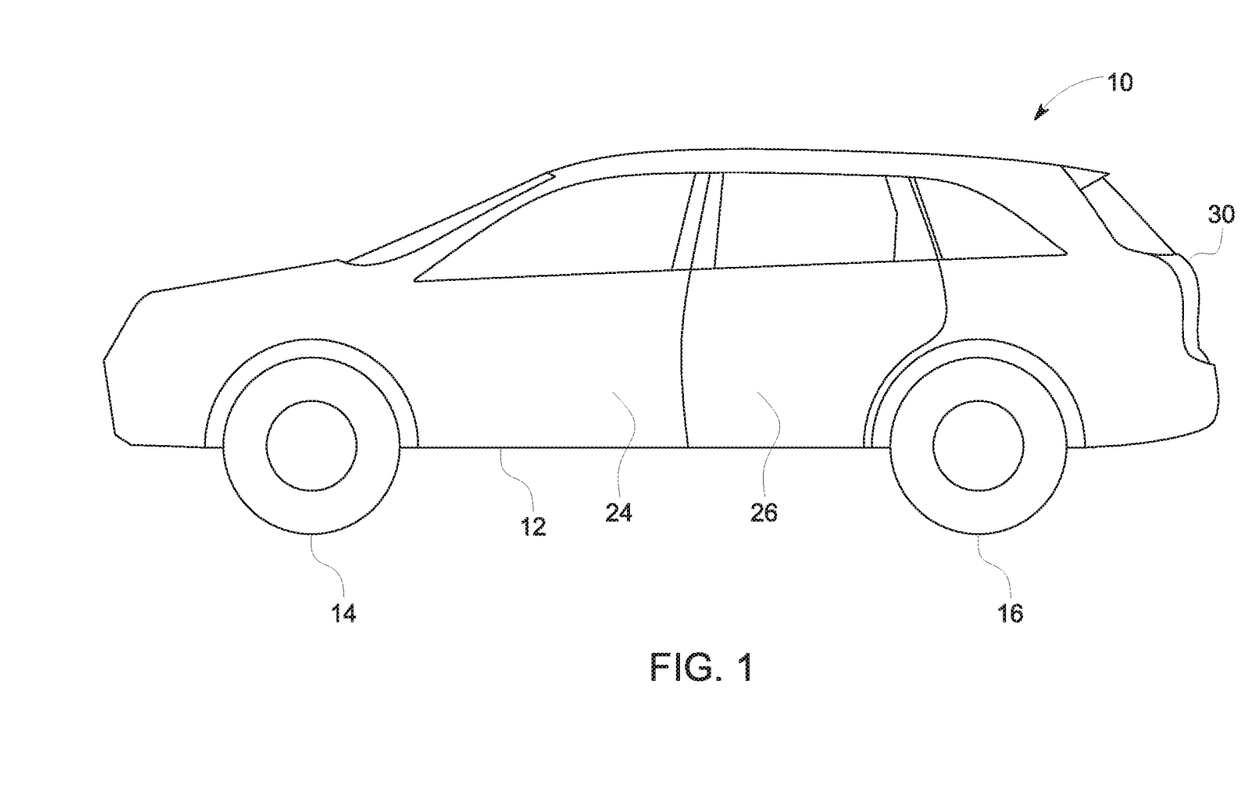
FIG. 1 is a side view of an exemplary vehicle including a tailgate assembly in accordance with the disclosed subject matter.

FIG. 1 is a side view of an exemplary vehicle 10 including a tailgate assembly 30 in accordance with the disclosed subject matter. The vehicle 10 shown in FIG. 1 is primarily for use on paved roadways, and can be referred to as a passenger vehicle. The vehicle 10 may also be for use on unpaved roadways consisting of gravel, dirt, sand, etc.

However, the disclosed tailgate assembly 30 can be used with any vehicle that is configured for travel along any one or combination of improved, unimproved, and unmarked roadways and paths consisting of gravel, dirt, sand, etc. For example, embodiments are intended to include or otherwise cover any type of automobile, including passenger car, minivan, truck, etc. In fact, embodiments are intended to include or otherwise cover configurations of the tailgate assembly 30 for use in any other type of vehicle, such as an aircraft, boat, ship, train, spacecraft, etc. Some other embodiments can be used in non-vehicular applications, such as for amusement park rides, elevators, or any other situation where access to an enclosed space can be provided through opening a door assembly.

The vehicle 10 can include a body 12, a pair of front wheels 14 (the right-side front wheel is obstructed from view), a pair of rear wheels 16 (the right-side rear wheel is obstructed from view), a pair of front door assemblies 24 (the right-side front door assembly is obstructed from view), a pair of rear door assemblies 26 (the right-side rear door assembly is obstructed from view), the tailgate assembly 30, a frame assembly, and a powertrain. The frame assembly and the powertrain are omitted from FIG. 1 for simplicity and clarity of the drawings.

II. Tailgate Assembly

Figure 2:
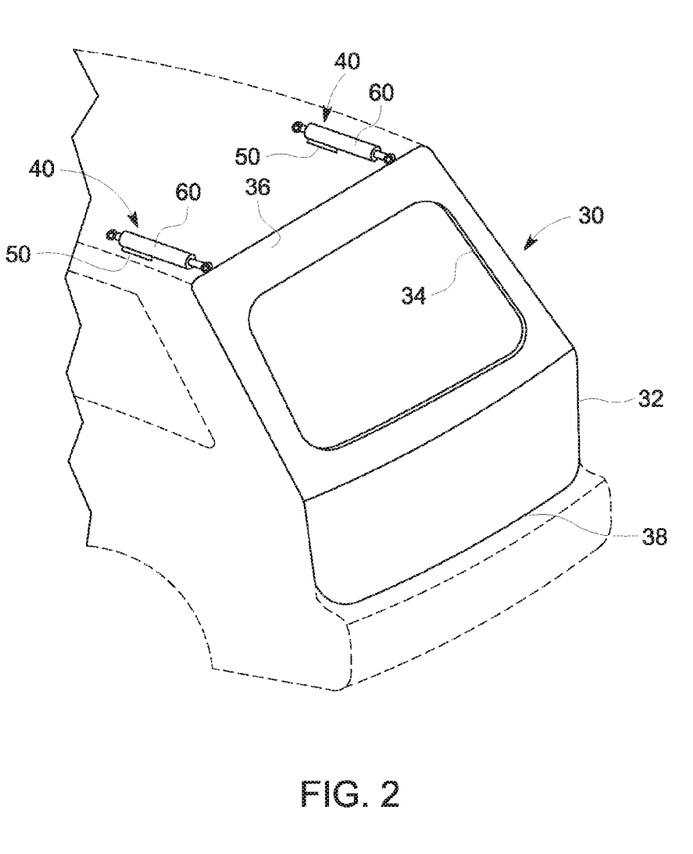
FIG. 2 is a partial perspective view of the exemplary tailgate assembly including strut assemblies in accordance with the disclosed subject matter.

FIG. 2 is a partial perspective view of the exemplary tailgate assembly 30 including strut assemblies 40 in accordance with the disclosed subject matter. The tailgate assembly 30 shown in FIG. 2 can be hingedly connected to the body 12 proximate a roofline at a rear of the vehicle 10. The tailgate assembly 30 may therefore move between opened and closed positions by rotating upward and downward via hinges.

The tailgate assembly 30 can include a door frame 32 defining a window opening 34. The door frame 32 has a hinge side 36 at an upper portion and a latch side 38 at a lower portion, the hinge side 36 being configured to connect to the roofline of the body 12 such that the door frame 32 rotates about the hinge side 36 to move between the opened and closed positions. Furthermore, the latch side 38 rotates with the door frame 32 to latch and unlatch with a lower portion of the body 12 proximate a rear bumper as the door frame rotates between opened and closed positions. The tailgate assembly 30 can alternatively be configured such that the door frame 32 is hingedly connected to a side portion of the body 12 at a rear of the vehicle 10. In such embodiments, the door frame 32 can rotate about the side portion of the body 12 and latch and unlatch with another side portion of the body 12. In yet further embodiments, the tailgate assembly 30 can be configured such that the door frame 32 is hingedly connected to the lower portion of the body 12. The door frame 32 can thereby rotate about the lower portion of the body 12 and latch and unlatch the portion of the body 12 proximate the roofline, or alternatively with another tailgate assembly in a clamshell manner.

The tailgate assembly 30 can include a pair of strut assemblies 40 configured for actuation of the door frame 32 about the hinge side 36 between the opened and closed positions. The strut assemblies 40 are connected to the body 12 proximate the hinges at the roofline, and the door frame 32 at the hinge side 36.

III. Strut Assembly

The pair of strut assemblies 40 can be configured to open and close the door frame 32 about the hinges at the hinge side 36, and can each include a motor assembly 50 and a spring assembly 60. The motor assemblies 50 can be configured to actuate the door frame 32 between the opened and closed positions via the respective spring assemblies 60. In the present embodiment, the strut assemblies 40 can include spindle drive systems for powered extensions and retraction of the door frame 32. The spindle drive systems can be disposed within the roof of the vehicle 10 to yield increased package space and utility over spindle drive systems positioned within gutters of the vehicle 10. Specifically, the spindle drive systems may be partially positioned within and reinforced by roof rails of the vehicle 10. However, other drive systems may be incorporated within the strut assemblies 40 to provide power opening and closing functionality for the tailgate assembly 30.

Figure 3:
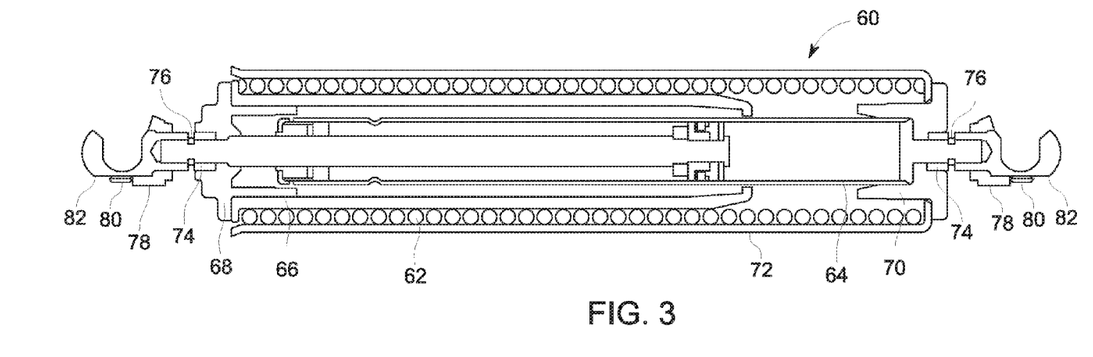
FIG. 3. is a cross-section view of the strut assembly of FIG. 2 including fuses at end portions of the strut assembly.

FIG. 3. shows a cross-section view of the strut assembly 40 of FIG. 2 including fuses 76 at end portions of the strut assembly 60. In addition to fuses 76 at end portions, the strut assembly 60 can include a spring 62 configured to surround a damper 64 and disposed within a cover 72. A spring guide 66 can be disposed between the damper 64 and the spring 62, the spring guide 66 being configured approximately as a cylindrical shell around the damper 64. The spring guide 66 may serve as a buffer and guide movement of the spring 62 both around the damper 64 and within the cover 72. Particularly, the spring guide 66 can guard against buckling of the spring 62 inwards towards the damper 64. As will be discussed in further detail below, the fuses 76 can be disposed at opposite ends of the damper 64 such that the spring 62 surrounds the damper 64 between the fuses 76. The fuses 76 are configured as parts positioned between fasteners and mount points on either end portion of the spring assembly 60. The spring 62 of the spring assembly 60 is configured to counteract weight of the tailgate assembly 30, particularly the door frame 32, during operation of the tailgate assembly 30 so that the respective motor assembly 50 may adequately power the tailgate assembly 30 to transition between the opened and closed positions.

The damper 64 of the present embodiment can extend through a center of the spring 62 along a longitudinal direction so that ends of the damper 64 extend beyond corresponding ends of the spring 62. Ends of the damper 64 can be threaded so as to be configured to receive a threaded base retainer 68 and a threaded tip retainer 70, respectively, the base retainer 68 and the tip retainer 70 configured to abut and retain the spring 62 between the ends of the damper 64 and within the cover 72. The base retainer 68 and the tip retainer 70 can be secured onto respective ends of the damper 64 by threaded nuts 74 screwed onto the threaded ends adjacent the base and tip retainers 68, 70. The nuts 74 may be accompanied by respective washers inserted onto respective portions of the damper 64 so as to be disposed adjacent the nuts 74 to provide additional support for securing the base and tip retainers 68, 70. Furthermore, the base retainer 68 and the tip retainer 70 maintain the spring 62 within the cover 72, the cover 72 being configured as an outer tube to surround an exterior of the spring 62. The base retainer 68 and the tip retainer 70 can alternatively be connected to the damper 64 to secure the spring 62 by locking or another appropriate method other than being screwed along threads, or by threaded nuts.

Figure 4:
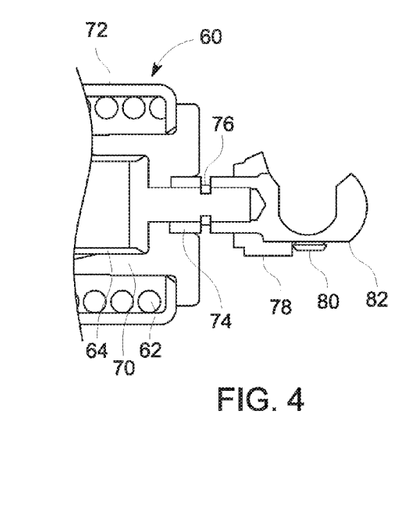
FIG. 4 is an enlarged cross-section view of the fuse of FIG. 3.

As shown in more detail in FIG. 4, the spring assembly 60 can include fuses 76 disposed at the end portions of the damper 64. The fuse 76 can be configured as a groove encircling a portion of the damper 64 adjacent the nut 74 such that the nut 74 is disposed between the fuse 76 and the tip retainer 70. The fuse 76 can be a mechanical fuse configured as a breaking point of the damper 64 such that a certain amount of force acting on the damper 64 may cause breakage of the damper 64 at the fuse 76. The configuration of the fuse 76 described above disposed proximate the tip retainer 70 may be applicable to the other fuse 76 disposed proximate the base retainer 68 at the opposite end of the damper 64. The spring assembly 60 can therefore be configured to have the pair of fuses 76 disposed at the ends of the damper 64 such that either fuse 76 may break to relieve stress on the spring assembly 60, as will be described below.

The spring assembly 60 can also include end fittings 82 and rotation fittings 78 disposed at the corresponding end portions of the damper 64. For example, the end portion of the damper 64 proximate the tip retainer 70 can include the end fitting 82 interconnected with the rotation fitting 78 so that the fittings 82, 78 are adjacent the fuse 76. Similarly, the opposite end portion of the damper 64 proximate the base retainer 68 can also include the other end fitting 82 interconnected with the rotation fitting 78 so that the fittings 82, 78 are adjacent the other fuse 76. The end fittings 82 are configured as connection components serving as mount points for coupling the spring assemblies 60 to both the roofline of the body 12 and the door frame 32. The end fittings 82 may therefore be formed as ball sockets to act as ball joints with complementary protrusions on both the body 12 and the door frame 32. A clip 80 can be included with each of the end fittings 82 to enhance connection between the end fitting 82 and the complementary protrusion received therein. This configuration permits the spring assemblies 60 to transition between various angles and positions as the door frame 32 rotations about the hinges between the opened and closed positions. As the end fittings 82 ensure retention of complementary connection structures on both the body 12 and the door frame 32, the rotation fittings 78 are configured to limit rotation of the end fittings 82 about the damper 64 to which they are attached. By limiting rotation of the end fittings 82, the rotation fittings 78 facilitate actuation of the spring assemblies 60 with a prescribed range of motion corresponding to the opened and closed positions of the door frame 32.

As described above, the fuse 76 can be configured as a groove at each end of the damper 64 disposed between the adjacent nuts 74 and end fittings 82. Specifically, the ends of the damper 64 include shaft-like portions extending along the direction of elongation, the shaft-like portions being threaded so as to accommodate the nuts 74 and the end fittings 82. The shaft-like portions may therefore be cylindrical with circular cross-sections. At the fuses 76 of each end, a diameter of the shaft-like portion is less than that of the shaft-like portion adjacent the fuses 76. The decreased diameter results in decreased structural rigidity of the shaft-like portion at the fuses 76, thereby biasing the spring assembly 60 to fail and break at the fuses 76 pending threshold force(s) acting on the spring assembly 60. The fuses 76 therefore preserve retention of the spring 62 within the spring assembly 60 via the base and tip retainers 68, 70 in conjunction with the corresponding nuts 74. The fuses 76 can alternatively be disposed adjacent welded flanges to retain the spring 62 within the spring assembly 60, rather than nuts 74.

By maintaining the base and tip retainers 68, 70 retaining the spring 62 within the spring assembly 60, the configuration of the nuts 74 and the fuses 76 impede the spring 60 such that the spring 60 may not be expelled from the spring assembly 60 by virtue of the spring bias force. Due to containment of the spring 62 within the spring assembly 60, and specifically on either end of the spring 62 by the base and tip retainers 68, 70, the spring 62 is thereby biased within the spring assembly 60. Thus, as discussed above, movement of either the base retainer 68 or the tip retainer 70 may result in expulsion of the spring 62 from the spring assembly 60. As will be described in detail below, the fuses 76 disposed outside of the nuts 74 encourage the spring assembly 60 to fail at the fuses 76 of the damper 64 as a result of threshold force(s) acting on the spring assembly 60 to safeguard the retention of the spring 62 by the base and tip retainers 68, 70.

IV. External Force Management

Figure 5A:
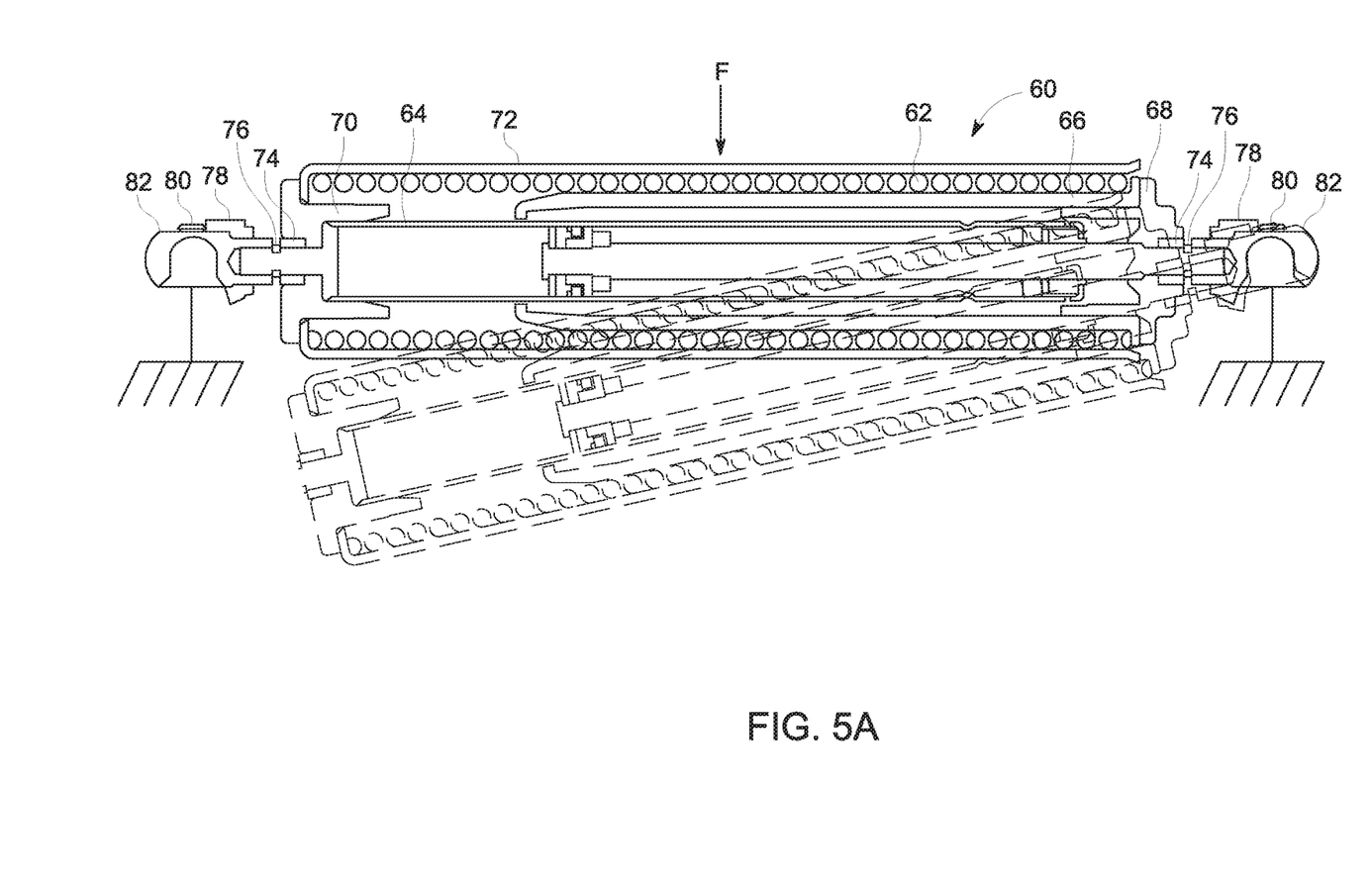
FIG. 5A is a side view of the exemplary strut assembly as a result of a center force.
Figure 5B:
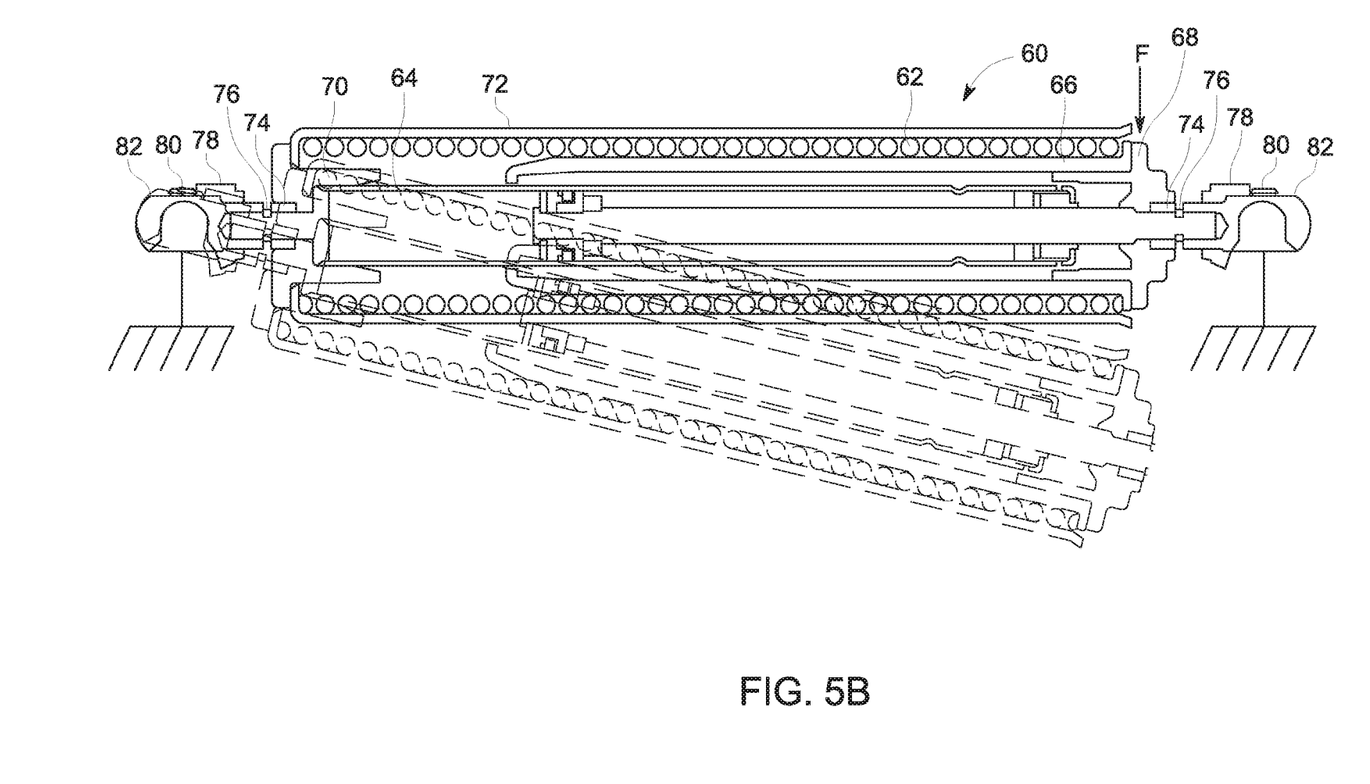
FIG. 5B is a side view of the exemplary strut assembly as a result of an end force.
Figure 5C:
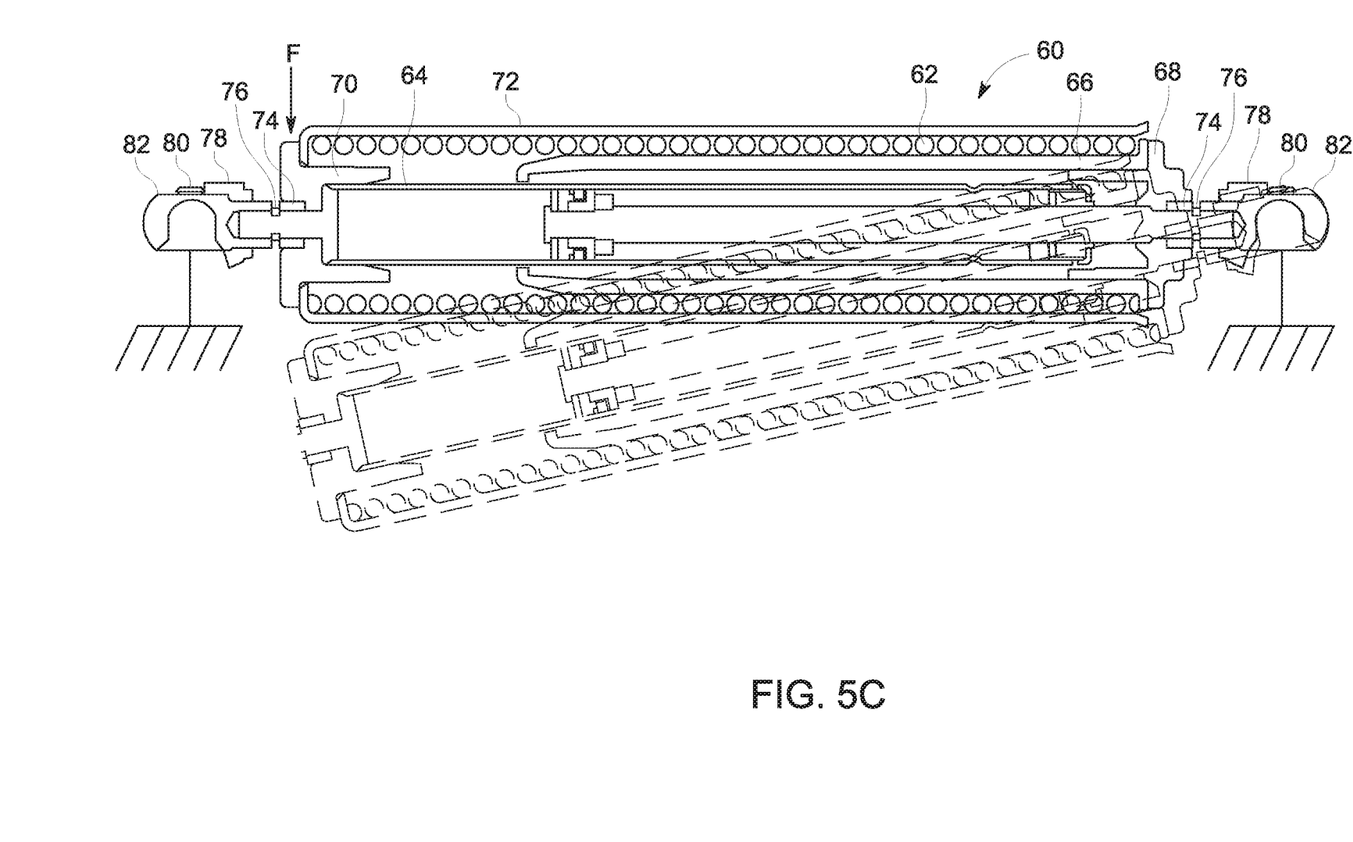
FIG. 5C is a side view of the exemplary strut assembly as a result of another end force.

FIGS. 5A-C are side views of the exemplary strut assembly 40 as a result of external forces F acting thereon. External force management during a predetermined transverse loading such as shear or bending applied to the tailgate assembly 30 that can be provided by the strut assemblies 40 is described with reference to FIGS. 5A-C. FIGS. 5A-C depict portions of the strut assemblies 40, notably the spring assemblies 60, prior to and following an external force F acting thereon. An external force F may act on directly or indirectly on the spring assemblies 60 during assembly of the tailgate assembly 30, and/or installation of the tailgate assembly 30 onto the vehicle 10. FIG. 5A depicts a possible orientation of the spring assembly 60 prior to and following an external force F acting on a central portion of the spring assembly 60, while FIGS. 5B-C depict possible orientations of the spring assembly 60 prior to and following an external force F acting on end portions of the spring assembly 60.

The spring assembly 60 shown in FIG. 5A includes the mechanical fuse 76 formed between the nut 74 adjacent the base retainer 68 and the end fitting 82. The fuse 76 can be configured as a failure point arranged at an uncovered and unprotected location along the shaft of the damper 64. The above described configuration allows the fuse 76 to fail under predetermined lateral and transverse loading forces such as shear and/or bending forces applied to the tailgate assembly 30. Transverse loading forces may occur during assembly and/or installation of the tailgate assembly 30, and specifically the strut assemblies 40. In the event an external force F is applied to the spring assembly 60 of the tailgate assembly 30, one or both of the fuses 76 may be configured to break and thereby permit movement of the spring assembly 60 in response to the force F.

FIG. 5A particularly depicts the force F applied to the central portion of the spring assembly 60, resulting in the fuse proximate the base retainer 68 breaking. As the fuse 76 breaks, the end portion of the damper 64 may move in response to the force F along a direction of the force F, as shown. A degree to which the spring assembly 60 is moved is dependent upon a magnitude of the force F, and whether the other fuse 76 proximate the tip retainer 70 is still intact. If the other fuse 76 is unbroken, the spring assembly 60 will rotate about the still attached end portion of the damper 64, whereas if the other fuse 76 also breaks, the spring assembly 60 may move in a manner uninhibited by other structures. The movement of the spring assembly 60 depicted in FIG. 5A represents a possible movement direction and orientation that the spring assembly 60 may adopt as a result of the force F, however the force F may cause the spring assembly 60 to move along any direction should at least one of the fuses 76 break. Thus, as described above, the fuses 76 of the spring assembly 60, in conjunction with the corresponding nuts 74, preserve integrity of the spring 62 containment between the base and tip retainers 68, 70 and within the cover 72.

In the instance in which an external force F acts on the central portion of the spring assembly 60 as shown in FIG. 5A, the spring assembly 60 may be configured to fail at either end such that either fuse 76 may break. Which fuse 76 breaks will be dependent upon which experiences direct or indirect force beyond a certain threshold such that the fuse 76 breaks to impede the force from increasing in magnitude on the spring assembly 60. Therefore, despite FIG. 5A depicting the fuse 76 proximate the base retainer 68 breaking from an external force F applied at the central portion of the spring assembly 60, the other fuse 76 proximate the tip retainer 70 can alternatively or additionally break as a result of an external force F applied at the central portion.

FIGS. 5B-C particularly depict forces F applied to opposing end portions of the spring assembly 60, resulting in the respective fuse 76 nearest the force F breaking. As described above, the fuse 76 is a weakened section that is not covered by another component such as a nut, washer, sleeve, etc. and therefore is predisposed to break and fail under excessive lateral forces applied to the spring assembly 60. These excessive forces may be present during assembly of the tailgate assembly 30, or alternatively during installment of the tailgate assembly 30 onto the vehicle 10. Without another component covering the weakened fuses 76 that could prevent shear or bending loads from being applied to the fuses 76, the fuse(s) 76 proximate the force F is configured to break and allow the spring assembly 60 to disconnect from a corresponding connection component without releasing the spring 62. For example, as shown in FIG. 5B, the fuse 76 proximate the tip retainer 70 can break and allow the spring assembly 60 to disconnect from the respective end fitting 82 while retaining the spring 62 between the base and tip retainers 68, 70 and within the cover 72. Alternatively, FIG. 5C depicts a situation in which the fuse 76 proximate the base retainer 68 can break and allow the spring assembly 60 to disconnect from the respective end fitting 82 while retaining the spring 62 between the base and tip retainers 68, 70 and within the cover 72. In both instances, the spring assembly 60 is configured to move along the direction of the force after disconnecting from the end fitting 82.

During operation of the tailgate assembly 30, it is possible that an external force may result in a tensile load on elements such as the strut assemblies 40. For instances of tensile forces, the tailgate assembly 30 can include a clutch mechanism for impeding tensile overloads during operation of the tailgate assembly 30. The tailgate assembly 30 thereby accommodates external forces during movement of the tailgate assembly 30 between the opened and closed positions via the clutch mechanism, while accommodating excessive lateral forces during assembly and installation of the tailgate assembly 30 via the fuses 76 of the spring assemblies 60, as described above.

V. Alternative Embodiments

While certain embodiments of the invention are described above, and FIGS. 1-5C disclose the best mode for practicing the various inventive aspects, it should be understood that the invention can be embodied and configured in many different ways without departing from the spirit and scope of the invention.

For example, embodiments are disclosed above in the context of the spring assemblies 60 of the tailgate assembly 30 shown in FIGS. 2-5C. However, embodiments are intended to include or otherwise cover any type of connection member having a spring disposed therein for facilitating ease of operation of an attached door, as disclosed above.

For example, exemplary embodiments are intended to include strut assemblies 40 having springs 62 contained therein for counteracting weight of the door frame 32 during operation of the tailgate assembly 30 about hinges at a rear of the body 12 of the vehicle 10. This tailgate assembly 30 can be hingedly connected to the body 12 at a rear portion of the roofline such that the tailgate assembly 30 hinges up to open and down to close. This hinging can encompass a multitude of positions of the tailgate assembly 30 along a curved path of motion around the hinges at the roofline. In another embodiment, the tailgate assembly 30 can be hingedly connected to a lower portion of the body 12 at the rear, such as proximate a rear bumper. In another alternate embodiment, the tailgate assembly 30 can be hingedly connected to side portions of the body 12 at the rear, so that the door frame 32 extends between the roofline and the rear bumper along either the driver-side or the passenger-side of the body 12.

In fact, in some embodiments, the strut assemblies 40 of the exemplary tailgate assembly 30 can be included in front or rear side doors of a vehicle. Furthermore, panels other than doors such as a hood/bonnet of a vehicle may include the disclosed strut assemblies 40 such that the panels are oriented so as to have forces acting thereon, either during assembly or installation onto the vehicle 10. Luggage compartments, convertible roofs, and motorized spoilers of vehicles may also be configured to incorporate the strut assemblies 40 in accordance with the disclosed subject matter.

All or some of the alternative structures disclosed above with regard to the tailgate assembly 30 also apply to non-vehicular applications. The above alternative configurations of the strut assemblies 40, and specifically the spring assemblies 60, are merely provided for exemplary purposes, and as indicated above, embodiments are intended to cover any type of connection member having a spring disposed therein that operate or otherwise perform as disclosed above. Embodiments are also intended to include or otherwise cover any alternative or additional connection members that are structured and disposed to perform as disclosed above with regard to the spring assemblies 60.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A vehicle spring assembly for use with a spindle motor that causes the vehicle spring assembly to actuate a vehicle tailgate relative to a vehicle body, the vehicle spring assembly comprising:
    a cylindrical hollow cover that extends along a direction of elongation and that defines an opening at each opposing end;
    a spring disposed within the cover that extends along the direction of elongation;
    a pair of fittings that are each disposed at one of the ends of the cover and configured to contain the spring within the cover, each of the fittings defining an aperture;
    an elongated damper that extends in part within the spring along the direction of elongation, the damper including a pair of opposing end sections that each extend through and project from the aperture of a respective one of the fittings, each of the end sections defining a groove, one of the end sections being connectable to the vehicle tailgate and the other of the end sections being connectable to the vehicle body; and
    a pair of fasteners, each of the fasteners securing one of the fittings to the cover and being disposed adjacent one of the grooves defined in the end sections of the damper.

2. The vehicle spring assembly according to claim 1, wherein each of the end sections of the damper is cylindrical, and each of the grooves extends along an entire circumference of the respective end section.

3. The vehicle spring assembly according to claim 2, wherein a majority of each of the cylindrical end sections defines a substantially constant diameter, and a diameter at the respective groove is smaller than the substantially constant diameter.

4. The vehicle spring assembly according to claim 1, wherein each fitting defines a recess facing away from the part of the damper that extends within the spring.

5. The vehicle spring assembly according to claim 4, wherein each fastener is a nut that is disposed within the recess of one of the fittings.

6. The vehicle spring assembly according to claim 5, wherein each fitting includes a flange that projects in a lateral direction that is substantially perpendicular to the direction of elongation, each of the flanges defining an exterior face that faces away from the part of the damper that extends within the spring, at least a part of the exterior face being aligned with an outward facing surface of the nut.

7. The vehicle spring assembly according to claim 6, wherein the entire exterior face of one of the flanges is planar.

8. The vehicle spring assembly according to claim 7, wherein the exterior face of the other of the flanges is stepped.

9. The vehicle spring assembly according to claim 1, further including a body connection fitting attached to one of the end sections of the damper and to the vehicle body, the body connection fitting defining a surface that faces one of the fasteners and being separated from the one fastener by one of the grooves.

10. The vehicle spring assembly according to claim 9, further including a tailgate connection fitting attached to the other of the end sections of the damper and to the vehicle tailgate, the tailgate connection fitting defining a surface that faces the other of the fasteners and being separated from the other fastener by the other of the grooves.

11. A spindle drive system for use with a vehicle tailgate and a vehicle body, the spindle drive system comprising:
    a vehicle spring assembly that includes:
        a cylindrical hollow cover that extends along a direction of elongation and that defines an opening at each opposing end;
        a spring disposed within the cover that extends along the direction of elongation;
        a pair of fittings that are each disposed at one of the ends of the cover and configured to contain the spring within the cover, each of the fittings defining an aperture;
        an elongated damper that extends in part within the spring along the direction of elongation, the damper including a pair of opposing end sections that each extend through and project from the aperture of a respective one of the fittings, each of the end sections defining a groove, one of the end sections being connectable to the vehicle tailgate and the other of the end sections being connectable to the vehicle body; and
        a pair of fasteners, each of the fasteners securing one of the fittings to the cover and being disposed adjacent one of the grooves defined in the end sections of the damper; and
    a spindle motor that is connected to the vehicle spring assembly and controllable to cause the vehicle spring assembly to actuate the vehicle tailgate relative to the vehicle body.

12. The spindle drive system according to claim 11, wherein each of the end sections of the damper is cylindrical, and each of the grooves extends along an entire circumference of the respective end section.

13. The spindle drive system according to claim 12, wherein a majority of each of the cylindrical end sections defines a substantially constant diameter, and a diameter at the respective groove is smaller than the substantially constant diameter.

14. The spindle drive system according to claim 11, wherein each fitting defines a recess facing away from the part of the damper that extends within the spring.

15. The spindle drive system according to claim 14, wherein each fastener is a nut that is disposed within the recess of one of the fittings.

16. The spindle drive system according to claim 15, wherein each fitting includes a flange that projects in a lateral direction that is substantially perpendicular to the direction of elongation, each of the flanges defining an exterior face that faces away from the part of the damper that extends within the spring, at least a part of the exterior face being aligned with an outward facing surface of the nut.

17. The spindle drive system according to claim 16, wherein the entire exterior face of one of the flanges is planar.

18. The spindle drive system according to claim 17, wherein the exterior face of the other of the flanges is stepped.

19. The spindle drive system according to claim 11, further including a body connection fitting attached to one of the end sections of the damper and to the vehicle body, the body connection fitting defining a surface that faces one of the fasteners and being separated from the one fastener by one of the grooves; and further including a tailgate connection fitting attached to the other of the end sections of the damper and to the vehicle tailgate, the tailgate connection fitting defining a surface that faces the other of the fasteners and being separated from the other fastener by the other of the grooves.

20. A method of manufacturing a vehicle spring assembly for use with a spindle motor that causes the vehicle spring assembly to actuate a vehicle tailgate relative to a vehicle body, the method comprising:

forming an opening at each opposing end of a cylindrical hollow cover that extends along a direction of elongation;

disposing a spring within the cover so as to extend along the direction of elongation;

disposing each of a pair of fittings at one of the ends of the cover so as to contain the spring within the cover;

defining an aperture in each of the fittings;

disposing an elongated damper so as to extend in part within the spring along the direction of elongation, the damper including a pair of opposing end sections that each extend through and project from the aperture of a respective one of the fittings;

forming a groove in each of the end sections of the damper;

connecting one of the end sections of the damper to the vehicle tailgate;

connecting the other of the end sections of the damper to the vehicle body;

securing the pair of fittings to the cover with a pair of fasteners; and disposing each of the fasteners adjacent one of the grooves defined in the end sections of the damper.

* * * * *